US007032055B2

(12) United States Patent
Luse et al.

(10) Patent No.: US 7,032,055 B2
(45) Date of Patent: Apr. 18, 2006

(54) DEVICE CONTROL AND CONFIGURATION

(75) Inventors: Paul E Luse, Chandler, AZ (US);
Reinhardt Michel, Neckarsulm (DE);
Wolfgang Michel, Bad Wimpfen (DE);
Mark Brown, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 10/140,631

(22) Filed: May 7, 2002

(65) Prior Publication Data

US 2003/0212846 A1 Nov. 13, 2003

(51) Int. Cl.
*G06F 13/00* (2006.01)

(52) U.S. Cl. .................... 710/305; 710/10; 710/266; 711/114

(58) Field of Classification Search ............. 710/1–3, 710/8–10, 266; 711/114
See application file for complete search history.

(56) References Cited

U.S. PATENT DOCUMENTS

| 5,838,935 A | 11/1998 | Davis et al. |
| 6,065,081 A | 5/2000 | Stancil et al. |
| 6,094,699 A | 7/2000 | Surugucchi et al. |
| 6,260,094 B1 | 7/2001 | Davis et al. |

FOREIGN PATENT DOCUMENTS

EP  0 772 134 A1  5/1997

OTHER PUBLICATIONS

R. Russell, BIOS Basics Online!, Jun. 5, 2001, one page.
A. Tischenko, "Zero-Channel RAID. The Economic Approach", Computer Review Online!, four pages.
Intel Corporation, "DK440LX Motherboard—Technical Product Specification", Oct. 1997, 106 pages.
Intel Corporation, "MROMB Design Considerations Using the Intel 80303 I/O Processor—Application Note" Sep. 2001, 15 pages.
Copy of PCT Search Report dated Apr. 19, 2004.
Adaptec—Adaptec SCSI RAID 2000S Support.
Adaptec—Adaptec SCSI RAID 2005S Support.

(Continued)

*Primary Examiner*—Rehana Perveen
*Assistant Examiner*—Clifford Knoll
(74) *Attorney, Agent, or Firm*—Rick Boyd

(57) ABSTRACT

In one embodiment, a method is provided. The method of this embodiment may include controlling, at least in part, by a first device, whether a first signal line of a second device is coupled to a bus, and whether a second signal line of a third device is coupled to the bus. The method of this embodiment may also include, after the first and second signal lines are coupled to the bus, supplying from the first device to the second and third devices, via the first and second signal lines, one or more signals that, after being received by the second and third devices, may permit, at least in part, at least one of control and configuration by the first device of the second and third devices. Of course, many modifications, variations, and alternatives are possible without departing from this embodiment.

9 Claims, 4 Drawing Sheets

OTHER PUBLICATIONS

Adaptec—Motherboard Partners and Compatibilty.
Adaptec—Adaptec SCSI RAID 2005S Technical SPecs.
Adpatec—Adaptec Article: Zero Channel RAID Frequently Asked Questions.
Intel Corp., Product Brief, Intel Server Board SCB2.
Serial ATA: High Speed Serialized AT Attachment Revision 1.0, Aug. 29, 2001.
Super0, Super P3TDDR, User's Manual, Revision 1.0a.
PCI Local Bus, PCI BIOS Specification, Revision 2.1 Aug. 26, 1994.
PCI Local Bus, PCT-to-PCI Bridge Architecture Specification, Revision 1.1, Dec. 16, 1998.
PCI Local Bus, PCI Local Bus Specification, Revision 2.2, Dec. 18, 1998.
PCI Local Bus, Mini PCI Specification, Revision 1.0, Oct. 25, 1999.
PCI Local Bus, PCI-X Addendum to the PCI Local Bus Specification, Revision 1.0a, Jul. 24, 2000.
PCI Local Bus, PCI Local Bus Specification, Revision 2.3, Mar. 29, 2002.
PCI Local Bus, Appendix D, Class Codes.
PCI Local Bus, Appendix H, Capability IDs, 0003.13.

DEVICE CONTROL AND CONFIGURATION

CROSS-REFERENCE TO RELATED APPLICATIONS

The subject matter disclosed in the subject application is related to the subject matter disclosed in co-pending U.S. patent application Ser. No. 09/472,502, filed Dec. 27, 1999, entitled "Controlling I/O Devices Independently Of A Host Processor," co-pending U.S. patent application Ser. No. 10/090,944, filed Mar. 4, 2002, entitled "Control Procedure Selection," co-pending U.S. patent application Ser. No. 10/112,789, filed Mar. 28, 2002, entitled "Device Discovery and Dynamic Configuration of Control Application," and co-pending U.S. patent application Ser. No. 10/113,458, filed Mar. 28, 2002, entitled "Device Resource Allocation."

FIELD

This disclosure relates to the field of device control and/or configuration.

BACKGROUND

In a modular redundant array of independent or inexpensive disk (RAID) on motherboard (MROMB) system, MROMB circuitry residing on a circuit card, for example, may be used to configure and/or control, independently of a host processor residing on a motherboard, an input/output (I/O) controller that also may reside on the motherboard. MROMB hardware on the motherboard may perform operations that may enable the MROMB circuitry on the circuit card to configure and/or control the I/O controller independently of the host processor.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

It should be understood that although the following Detailed Description will proceed with reference being made to illustrative embodiments, many alternatives, modifications, and variations thereof will be apparent to those skilled in the art.

DETAILED DESCRIPTION

Figure 1:
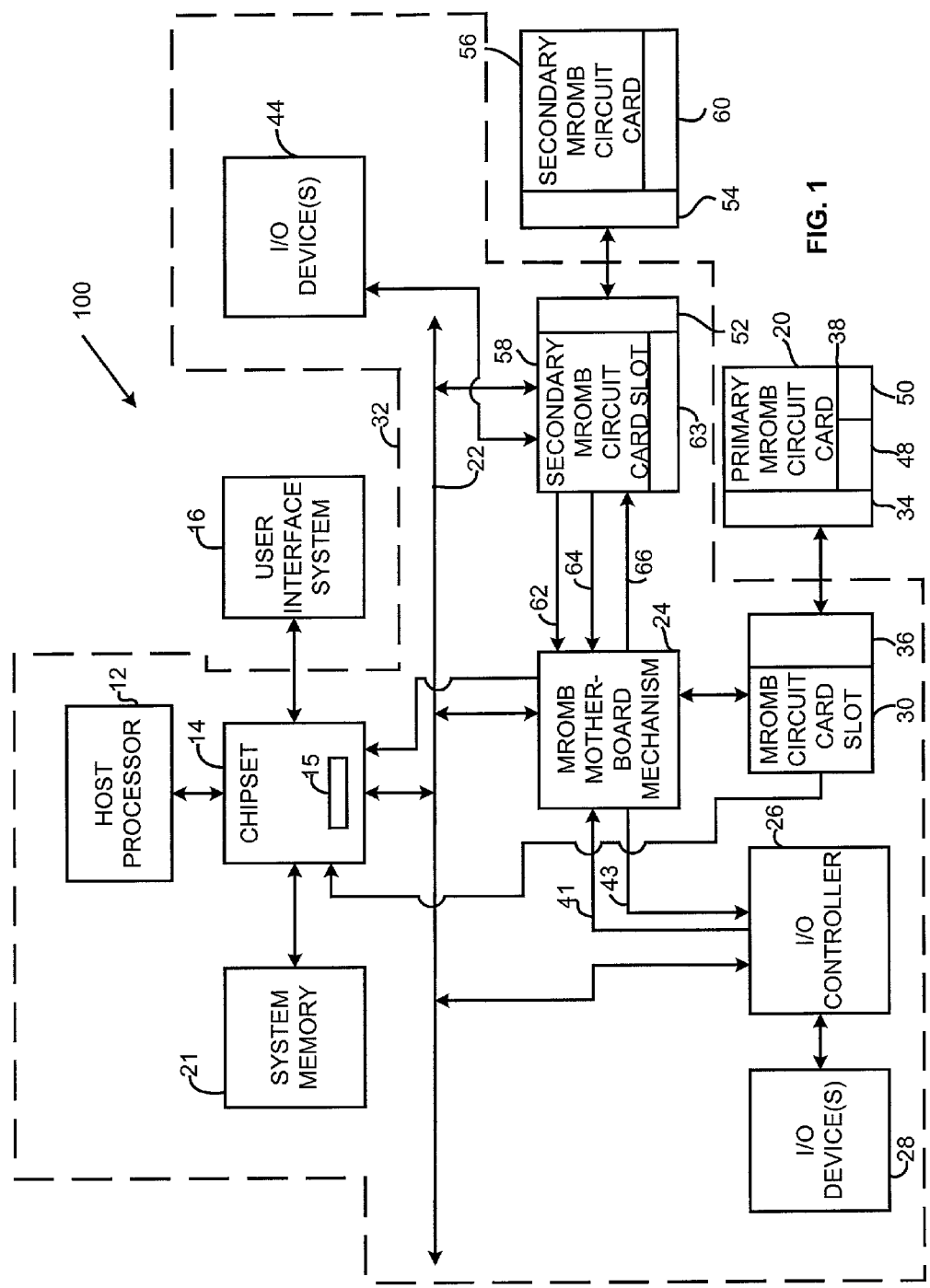
FIG. 1 is a diagram that illustrates an embodiment of claimed subject matter.

FIG. 1 illustrates a system embodiment 10. System 10 may include a host processor 12 coupled to a chipset 14. Host processor 12 may comprise, for example, an Intel® Pentium® III or IV microprocessor that is commercially available from the assignee of the subject application. Of course, alternatively, host processor 12 may comprise another type of microprocessor, such as, for example, a microprocessor that is manufactured and/or commercially available from a source other than the assignee of the subject application, without departing from this embodiment.

Chipset 14 may comprise a host bridge/hub system that may couple host processor 12, a system memory 21 and a user interface system 16 to each other and to a bus system 22. Chipset 14 may also include an I/O bridge/hub system (not shown) that may couple the host bridge/bus system to bus 22. Chipset 14 may comprise integrated circuit chips, such as those selected from integrated circuit chipsets commercially available from the assignee of the subject application (e.g., graphics memory and I/O controller hub chipsets), although other integrated circuit chips may also, or alternatively be used, without departing from this embodiment. Additionally, chipset 14 may include an interrupt controller 15 that may process interrupts that it may receive from other components in system 100, such as, for example, primary MROMB circuit card 20, when card 20 is properly inserted into circuit card bus extension slot 30, I/O controller 26, and secondary MROMB circuit card 56, when card 56 is properly inserted into circuit card slot 58. Of course, alternatively, the operative circuitry 38 described herein as being comprised in card 20, need not be comprised in card 20, but instead, without departing from this embodiment, may be comprised in other structures, systems, and/or devices that may be coupled to bus 22, and exchange data and/or commands with other components in system 100. Similarly, the operative circuitry 60 described herein as being comprised in card 56, need not be comprised in card 56, but instead, without departing from this embodiment, may be comprised in other structures, systems, and/or devices that may be coupled to bus 22, and exchange data and/or commands with other components in system 100. User interface system 16 may comprise, e.g., a keyboard, pointing device, and display system that may permit a human user to input commands to, and monitor the operation of, system 100.

Bus 22 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, if system 100 is appropriately modified, bus 22 instead may comprise a bus that complies with the PCI-X Specification Rev. 1.0a, published by and available from the aforesaid PCI Special Interest Group, Portland, Oreg., U.S.A. (hereinafter referred to as a "PCI-X bus"). It should be appreciated, however, that if system 100 is appropriately modified, bus 22 may comprise other types and configurations of bus systems, without departing from this embodiment.

An I/O controller 26 may be coupled, via MROMB motherboard hardware mechanism 24, to chipset 14, PCI bus 22, and MROMB circuit card slot 30. I/O controller 26 may also be coupled to and control the operation of one or more I/O devices (hereinafter collectively or singly referred to as "I/O device 28"). I/O device 28 may comprise, for example, a set of one or more storage devices comprising, e.g., one or more magnetic disks, optical disks, or solid-state storage devices. The one or more storage devices may be comprise, e.g., one or more arrays of mass storage devices.

Alternatively, I/O device 28, instead, may comprise one or more network adapter or interface devices that may be used to interface system 100 to one or more external computer networks. According to this alternative arrangement, I/O device 28 may exchange data and/or commands with external network devices (e.g., host or server computer nodes) via the one or more external computer networks.

System 100 also may include a secondary MROMB circuit card slot 58 that may be coupled, via MROMB hardware mechanism 24, to primary MROMB circuit card slot 30; slot 58 may also be coupled to bus 22. System 100 may also include one or more I/O devices (hereinafter collectively or singly referred to as "I/O device 44") that may be coupled to slot 58. I/O device 44 may comprise, for example, a set of one or more storage devices comprising, e.g., one or more magnetic disks, optical disks, or solid-state storage devices. These one or more storage devices may be, e.g., one or more arrays of mass storage devices.

Alternatively, I/O device 44 may comprise one or more network adapter or interface devices that may be used to interface system 100 to one or more external computer networks. According to this alternative arrangement, I/O device 44 may exchange data and/or commands with external network devices (e.g., host or server computer nodes) via the one or more external computer networks.

Card 56 may include circuitry, such as, for example, I/O controller circuitry 60. When card 56 is properly coupled to slot 58, circuitry 60 may exchange data and/or commands with I/O device 44. By exchanging such data and/or commands with I/O device 44, circuitry 60 may control and/or monitor operation of I/O device 44.

Processor 12, system memory 21, chipset 14, PCI bus 22, MROMB hardware mechanism 24, primary MROMB circuit card slot 30, I/O controller 26, and secondary MROMB circuit card slot 58 may be comprised in a single circuit board, such as, for example, a system motherboard 32. Although I/O device 28 and I/O device 44 are shown in FIG. 1 as being comprised in motherboard 32, I/O device 28 and/or I/O device 44 need not be comprised in the motherboard 32. For example, I/O device 28 and/or I/O device 44 each may be comprised in one or more enclosures that may be separate from the enclosure in which motherboard 32 and the components comprised in motherboard 32 may be enclosed.

Depending upon the particular configuration and/or operational characteristics of I/O device 28, I/O controller 26 may exchange data and/or commands with I/O device 28 using any one of a variety of different communication protocols, e.g., a Small Computer Systems Interface (SCSI), Fibre Channel (FC), Ethernet, Serial Advanced Technology Attachment (S-ATA), or Transmission Control Protocol/Internet Protocol (TCP/IP) communication protocol. Of course, alternatively, I/O controller 26 may exchange data and/or commands with I/O device 28 using other communication protocols, without departing from this embodiment of the claimed subject matter.

In accordance with this embodiment, a SCSI protocol that may be used by controller 26 to exchange data and/or commands with I/O device 28 may comply or be compatible with the interface/protocol described in American National Standards Institute (ANSI) Small Computer Systems Interface-2 (SCSI-2) ANSI X3.131-1994 Specification. If a FC protocol is used by controller 26 to exchange data and/or commands with I/O device 28, it may comply or be compatible with the interface/protocol described in ANSI Standard Fibre Channel (FC) Physical and Signaling Interface-3 X3.303:1998 Specification. Alternatively, if an Ethernet protocol is used by controller 26 to exchange data and/or commands with I/O device 28, it may comply or be compatible with the protocol described in Institute of Electrical and Electronics Engineers, Inc. (IEEE) Std. 802.3, 2000 Edition, published on Oct. 20, 2000. Further, alternatively, if a S-ATA protocol is used by controller 26 to exchange data and/or commands with I/O device 28, it may comply or be compatible with the protocol described in "Serial ATA: High Speed Serialized AT Attachment," Revision 1.0, published on Aug. 29, 2001 by the Serial ATA Working Group. Also, alternatively, if TCP/IP is used by controller 26 to exchange data and/or commands with I/O device 28, it may comply or be compatible with the protocols described in Internet Engineering Task Force (IETF) Request For Comments (RFC) 791 and 793, published September 1981. Also in accordance with this embodiment, if I/O device 28 is used to interface system 100 to one or more external computer networks, I/O device 28 may exchange data and/or commands with external host and/or server computer nodes via the one or more external computer networks using, e.g., the aforesaid TCP/IP and/or Ethernet protocols.

Similarly, depending upon the particular configuration and operational characteristics of I/O device 44, when secondary MROMB circuit card 56 is properly inserted into slot 58, card 56 may exchange data and/or commands with I/O device 44 using one of the different types of communication protocols that may be used by I/O controller 26 (depending upon the particular configuration and operational characteristics of I/O device 28) to exchange data and/or commands with I/O device 28. Alternatively, card 56 may exchange data and/or commands with I/O device 44 using other communication protocols, without departing from this embodiment. The communication protocol or protocols employed by card 56 to exchange data and/or commands with I/O device 44 may be the same as, or different from, those employed by I/O controller 26 to exchange data and/or commands with I/O device 28, without departing from this embodiment.

Circuit card slot 30 may comprise a PCI expansion slot that may comprise a PCI bus interface and/or connector (hereinafter collectively or singly referred to as "connector 36"). Card 20 may include a PCI bus connector 34 that may be insertable into and receivable by connector 36 such that connector 34 may be electrically and mechanically mated with connector 36. Similarly, circuit card slot 52 may comprise a PCI expansion slot that may comprise a PCI bus interface and/or connector (hereinafter collectively or singly referred to as "connector 52"). Card 56 may include a PCI bus connector 54 that may be insertable into and receivable by connector 52 such that connector 54 may be electrically and mechanically mated with connector 52.

In addition to comprising connector 34, circuit card 20 also may comprise MROMB circuitry 38. Circuitry 38 may comprise an I/O processor 50 and computer-readable memory 48. Depending upon the particular embodiment, memory 48 may comprise one or more of the following types of computer-readable memories: semiconductor firmware memory, programmable memory, non-volatile memory, read only memory, electrically programmable memory, random access memory, cache memory, flash memory, magnetic disk memory, and/or optical disk memory. Additionally, it should be appreciated that, either additionally or alternatively, memory 48 may comprise other and/or later-developed types of computer-readable memory. Processor 50 may include integrated circuit chips (not shown) comprised in an integrated circuit chipset, such as those commercially available from the assignee of the subject application (e.g., the Intel® 80310 Chipset). Alternatively, processor 50 instead may comprise other integrated circuit chips (e.g., the Intel® 80960 RM/RN I/O processor, the Intel® 80321 processor, and/or other types of processors that are available from sources other than the assignee of the subject application), or other types of processors/integrated circuits without departing from this embodiment of the claimed subject matter.

When card 20 is properly inserted into slot 30, connectors 34 and 36 become electrically and mechanically coupled to each other. When connectors 34 and 36 are so coupled to each other, card 20 becomes electrically coupled to bus 22 and interrupt controller 15, and card 20 also becomes electrically coupled, via motherboard MROMB hardware mechanism 24, to controller 26 and slot 58.

When card 56 is properly inserted into slot 58, connectors 52 and 54 become electrically and mechanically coupled to each other. When connectors 52 and 54 are so coupled to each other, card 56 becomes electrically coupled to bus 22, I/O device 44, and motherboard MROMB hardware mechanism 24.

In this embodiment, MROMB hardware mechanism 24 in motherboard 32 permits a MROMB technique to be implemented in system 100. It should be appreciated that the particular MROMB technique implemented in system 100 may vary without departing from this embodiment.

Figure 2:
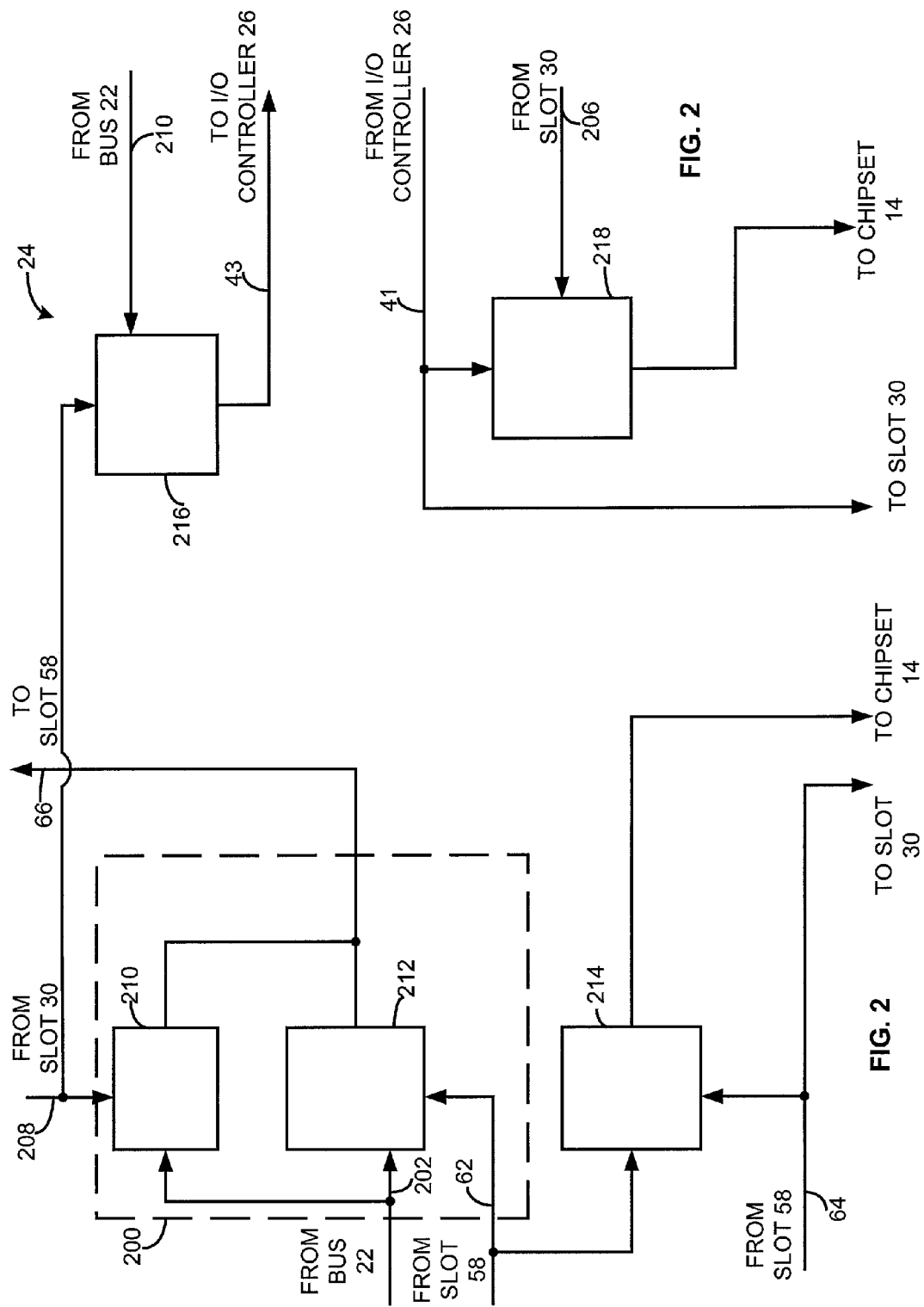
FIG. 2 is a diagram of MROMB motherboard hardware that may be comprised in the embodiment of FIG. 1.

With particular reference now being made to FIGS. 1 and 2, an example of a MROMB technique, according to this embodiment, that may be implemented in system 100 will be described. In system 100, MROMB hardware 24 may comprise two PCI Initialization Device Select (IDSEL) control mechanisms 200 and 216, and two interrupt steering mechanisms 214 and 218.

IDSEL control mechanism 200 may be coupled to PCI bus 22, circuit card slot 30, and circuit card slot 58. IDSEL control mechanism 200 may include transistor-based switch circuitry 210 and 212. Control signals may be supplied from slots 30 and 58 via signal lines 208 and 62 that may control, at least in part, switch circuitry 210 and 212. Based at least in part upon the control signals supplied via lines 208 and 62 to circuitry 210 and 212, circuitry 210 and 212 may controllably couple an IDSEL signal line 66 of slot 58 to, or de-couple line 66 from PCI bus 22. When card 56 is coupled to slot 58, IDSEL signal line 66 may be coupled to the IDSEL signal line of card 56. As used hereinafter, "IDSEL signal line 66" may refer collectively and/or singly to the IDSEL signal line of card 56 and/or the IDSEL signal line of slot 58.

Depending upon the control signals supplied via lines 208 and 62, IDSEL signal line 66 may be coupled via MROMB hardware 24 to a predetermined one 202 of the address lines of bus 22, and when line 66 is so coupled to address line 202, one or more IDSEL signals may be supplied to card 56 via line 66 that may be used during configuration cycles (such as, for example, following a reset of system 100) as one or more select or enable signals to enable configuration and/or control of, and/or the obtaining of configuration-related information stored in card 56 during such configuration cycles. As used herein, a first device (such as, for example, card 56) may be considered to be controlled or under the control of a second device (such as, for example, card 20), if the second device may supply one or more signals to the first device that may result in change and/or modification of first device's operation. Also as used herein, configuration of such a first device by such a second device may comprise the supplying by the second device of one or more signals that may be result in selection, change, and/or modification of one or more values and/or parameters stored in the first device that may result in change and/or modification of at least one operational characteristic and/or mode of the first device.

In accordance with this embodiment, slot 30 is constructed such that, when card 20 is absent from slot 30, the control signal that is supplied via line 208 to circuitry 210 results in closing of switch circuitry 210; this results in coupling of IDSEL signal line 66 to line 202 of bus 22. However, when card 20 is properly inserted into slot 30, slot 30 may supply a control signal to circuitry 210 via line 208 that may result in the opening of switch circuitry 210.

Also in accordance with this embodiment, slot 58 or motherboard 32 may include a switch or jumper 63 that may be manually set (e.g., by a not shown human operator) to control the assertion and de-assertion of the control signal supplied to circuitry 212 via line 62. If circuit card 56 does not comprise circuitry that is intended to be controlled and/or configured by card 20, jumper 63 may be set such that the control signal supplied to circuitry 212 via line 62 results in closing of switch circuitry 212. Conversely, if circuit card 56 comprises circuitry, such as, for example, controller circuitry 60, that is intended to be controlled and/or configured by card 20, jumper 63 may be set such that the control signal supplied to circuitry 212 via line 62 results in opening of switch circuitry 212. Thus, when card 20 is properly inserted in slot 30 and card 56 does not comprise circuitry that is intended to be controlled and/or configured by card 20, the control signals that may be supplied to circuitry 210 and 212 via lines 208 and 62 may result in coupling of IDSEL line 66 to address line 202 of bus 22. This may permit host processor 12 to drive line 66 during host processor-initiated configuration cycles. This may permit card 56 to be located, configured, and/or controlled by host processor 12 during such host processor-initiated configuration cycles.

Conversely, when card 20 is properly inserted into slot 30 and card 56 comprises circuitry that is intended to be controlled and/or configured by card 20, the control signals that may be supplied to circuitry 210 and 212 via lines 208 and 62 may result in decoupling of IDSEL line 66 from address line 202 of bus 22 during host processor-initiated configuration cycles, thereby "hiding" card 56 from host processor 12 during such configuration cycles. Thereafter, by appropriately controlling the control signal that may be supplied to circuitry 210 via line 208, card 20 may selectively couple IDSEL line 66 to, and/or selectively de-couple IDSEL line 66 from address line 202 of bus 22, for example, during multiple scans of bus 22 initiated by I/O processor 50, in order to permit card 56 to be located, configured and/or controlled by card 20, instead of by host processor 12. With the exception of predetermined address line 202 of bus 22 that may be used to propagate one or more PCI IDSEL signals to the card 56, in this embodiment, the signal lines of PCI bus 22 may be directly coupled to slot 58 in such a way as to permit card 56 to exchange data and/or commands, via bus 22, with other devices in system 100 that may also be coupled to bus 22, when card 56 is coupled to slot 58.

Interrupt steering mechanism 214 may be coupled to circuit card slot 30, circuit card slot 58, and interrupt controller 15 in chipset 14. Mechanism 214 may comprise tri-state buffer circuitry that may be controlled, at least in part, by the control signal supplied via line 62. When card 56 is coupled to slot 58, one or more interrupt signal lines 64 of slot 58 may be coupled to one or more interrupt signal lines of card 56. As used hereinafter, "one or more interrupt signal lines 64" may refer collectively and/or singly to these one or more interrupt signal lines of card 56 and/or slot 58. When jumper 63 is set such that the control signal supplied to circuitry 212 via line 62 results in closing of switch circuitry 212, this control signal also results in coupling by circuitry 214 of one or more interrupt signal lines 64 to interrupt controller 15 in chipset 14. Conversely, when jumper 63 is set such that the control signal supplied to circuitry 210 via line 62 results in opening of switch circuitry 212, this control signal also results in de-coupling by circuitry 214 of one or more interrupt signal lines 64 from interrupt controller 15 in chipset 14. Thus, when card 56 does not comprise circuitry that is intended to be controlled and/or configured by card 20, the control signal that is supplied to circuitry 214 may result in coupling of one or more interrupt signal lines 64 to controller 15; this may permit interrupts generated by card 56 to be received and processed by controller 15. Conversely, when card 56 comprises circuitry that is intended to be controlled and/or configured by card 20, the control signal that is supplied to circuitry 214 may result in decoupling of one or more interrupt signal lines 64 from controller 15; this may permit interrupts generated by card 56 to be processed by card 20 instead of by controller 15.

IDSEL control mechanism 216 may be coupled to PCI bus 22, circuit card slot 30, and I/O controller 26. IDSEL control mechanism 216 may include transistor-based switch circuitry that may controllably couple an IDSEL signal line 43 of I/O controller 26 to, and/or de-couple line 43 from a predetermined address line 210 of PCI bus 22, based at least in part, upon the control signal provided supplied from slot 30 via line 208. One or more PCI IDSEL signals may be supplied to controller 26 via line 43 that may be used during configuration cycles (such as, for example, following a reset of system 100) as one or more select or enable signals to enable configuration and/or control of, and/or the obtaining of configuration-related information stored in I/O controller 26 during such configuration cycles. In accordance with this embodiment, when card 20 is absent from slot 30, the control signal supplied via line 208 results in mechanism 216 coupling IDSEL signal line 43 to address line 210 of bus 22 in order to allow host processor 12 to drive line 43 during host processor-initiated configuration cycles. However, when card 20 is properly inserted into slot 30, the control signal supplied via line 208 to mechanism 216 results in mechanism 216 de-coupling IDSEL line 43 of controller 26 from address line 210 of bus 22 to "hide" controller 26 from host processor 12 during such cycles. Thereafter, by appropriately controlling the control signal supplied via line 208, card 20 may selectively couple IDSEL line 43 of I/O controller 26 to, and/or selectively de-couple line 43 of I/O controller 26 from address line 210 of bus 22, for example, during multiple scans of bus 22 initiated by I/O processor 50, in order to permit controller 26 to be located, configured and/or controlled by card 20, instead of by host processor 12. With the exception of the predetermined address line 210 of bus 22 that is used to propagate the one or more IDSEL signals to I/O controller 26, in this embodiment, the signal lines of PCI bus 22 may be directly coupled to I/O controller 26 in such a way as to permit I/O controller 26 to exchange data and/or commands, via bus 22, with other devices in system 100 that may also be coupled to bus 22.

Interrupt steering mechanism 218 may comprise tri-state buffer circuitry that may controllably couple one or more interrupt signal lines 41 from controller 26 to interrupt controller 15 in chipset 14 based, at least in part, upon a control signal supplied from slot 30 to mechanism 218 via control signal line 206. This control signal may result in interrupt signal lines 41 of I/O controller 26 being coupled to interrupt controller 15 when card 20 is absent from slot 30, and may result in lines 41 being de-coupled from interrupt controller 15 when card 20 is properly inserted in slot 30. Thus, when card 20 is absent from slot 30, one or more interrupt signals generated by I/O controller 26 may be received and processed by interrupt controller 15. Conversely, when card 20 is present in slot 30, these one or more interrupt signals generated by I/O controller 26 may be processed by card 20. Slot 30 may transmit interrupt signals generated by card 20, when card 20 is properly inserted into slot 30, to interrupt controller 15 to permit these interrupt signals to be handled by interrupt controller 15.

In this embodiment, the control signal that may be supplied via line 208 may be the Joint Test Action Group (JTAG) IEEE Standard Test Access Port and Boundary-Scan Architecture Test Mode Select (TMS) signal from PCI bus slot 30. This TMS signal may be compliant with IEEE Standard 1149.1-1990. That is, the TMS signal pin in PCI slot 30 may be coupled via line 208 to circuitry 210 and mechanism 216, and the signal (hereinafter termed the "TMS signal") propagating from this signal pin via line 208 to circuitry 210 and mechanism 216 may control circuitry 210 and mechanism 216 in the manner described above. When the TMS signal is asserted, this may result in switch circuitry 210 and mechanism 216 coupling IDSEL lines 66 and 43 to address lines 202 and 210, respectively.

Also in this embodiment, the control signal that may be controlled by jumper 63 may be the JTAG Test Data Input (TDI) signal from PCI bus slot 58. This TDI signal may be compliant with IEEE Standard 1149.1-1990. That is, the TDI signal pin in PCI slot 58 may be coupled via jumper 63 to line 62, and line 62 may be coupled to circuitry 212 and mechanism 214. When jumper 63 is set such that the TDI signal of slot 58 is asserted, this may result in the opening of switch circuitry 212, and may also result in mechanism 214 de-coupling one or more interrupt signal lines 64 from interrupt controller 15.

Additionally, in this embodiment, the control signal that may be supplied via line 206 may be the signal (hereinafter termed the "TDI signal" from slot 30) propagating through the JTAG TDI pin of slot 30. When the TDI signal from slot 30 is asserted, this may result in the mechanism 218 de-coupling one or more interrupt lines 41 from interrupt controller 15.

Processor 50 may issue control signals to card 20 that may result in card 20 providing appropriate control signals to hardware mechanism 24 to control circuitry 210, mechanism 216, and mechanism 218 in the manner described previously. Card 20 may include firmware program instructions stored in memory 48. If card 56 contains circuitry that is intended to be controlled and/or configured by card 20, jumper 63 may be set so as to assert the TDI signal of slot 58. Thereafter, the execution of these instructions by processor 50 may result in card 20 issuing appropriate control signals to hardware 24 to permit card 20 to control and/or configure I/O controller 26 and/or card 56.

Figure 3:
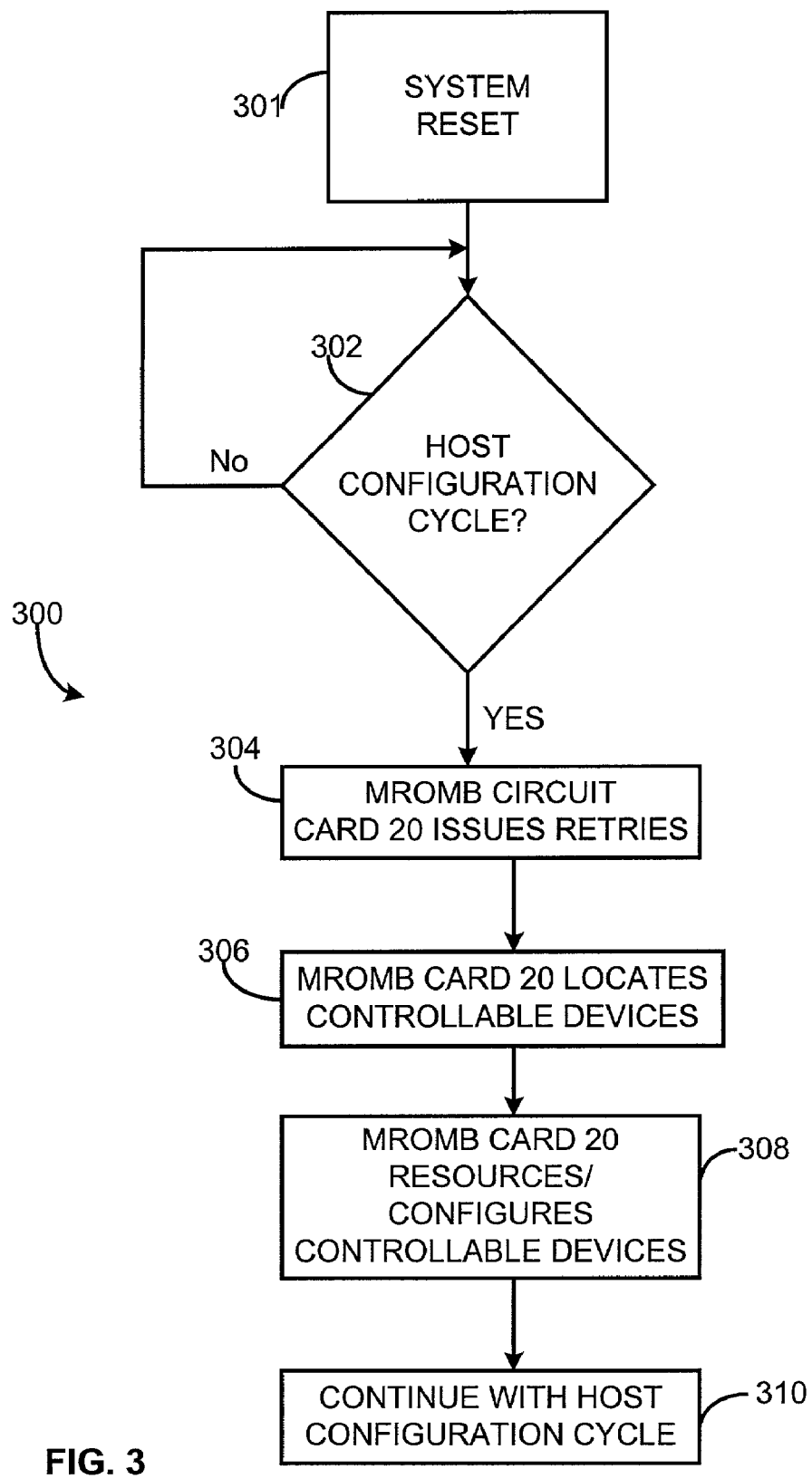
FIG. 3 is a flowchart that illustrates operations that may be involved in one embodiment.

FIG. 3 is a flowchart that illustrates operations 300 that may be carried out in system 100, in accordance with one embodiment, if card 56 contains circuitry that is intended to be controlled and/or configured by card 20. In system 100, after, for example, jumper 63 has been set so as to assert the TDI signal of slot 58 and a reset of system 100, such as operation 302 in FIG. 3, has occurred, host processor 12 may initiate and execute configuration cycles for devices (hereinafter termed "bus addressable devices," e.g., I/O controller 26, card 56, and card 20) that are coupled to, and are addressable and/or configurable via bus 22 in such configuration cycles.

After I/O processor 50 has determined that host processor 12 has initiated such configuration cycles, I/O processor 50 may signal card 20. This may result in card 20 issuing retries to host processor 12 to hold-off these configuration cycles initiated by the host processor 12, such as in operation 304 in FIG. 3. Thereafter, while host processor-initiated configuration cycles initiated are being held-off, I/O processor 50 may signal card 20 to assert the TMS signal propagated via line 208. Thereafter, processor 50 may determine the location or locations (e.g., the addresses along bus 22) of any bus addressable devices in system 100 that may be controlled and/or configured by card 20 during one or more configuration cycles initiated by I/O processor 50, using hardware mechanism 24, as illustrated by operation 306 in FIG. 3. As used herein, a first device (such as, for example, I/O controller 26 or card 56) may be considered to be "configurable" by a second device (such as, for example, I/O processor 50), if the second device is capable, at least in part, of controlling and/or selecting at least one feature, mode, and/or characteristic of operation of the first device. For example, the bus addresses of any such bus addressable devices may be predetermined, and processor 50 may be programmed with information that specifies these predetermined addresses. Based upon this information, the processor 50 may determine the location or locations of any such controllable and/or configurable bus addressable devices.

Alternatively, processor 50 may determine the location or locations of any such controllable and/or configurable bus addressable devices in system 100 based, at least in part, upon results of multiple bus scans, for example, in accordance with the teachings of Paul E. Luse and Dieter E. Massa, U.S. patent application Ser. No. 10/112,789, entitled "DEVICE DISCOVERY AND DYNAMIC CONFIGURATION OF CONTROL APPLICATION," which Application is assigned to the Assignee of the subject application, and was filed on Mar. 28, 2002. As used herein, a "bus scan" involves the issuance of one or more requests (such as, for example, configuration read requests) to one or more addresses of a bus (such as, for example, bus 22) to obtain one or more responses (such as, for example, configuration read responses) that may be, and/or contain information indicative of the existence, characteristics, type, and/or operation of one or more bus addressable devices.

For example, in system 100, I/O controller 26 and card 56 may be bus addressable devices that may be controllable and/or configurable by processor 50 using hardware 24. Accordingly, as a result of operation 306, processor 50 may determine that I/O controller 26 and card 56 are such bus addressable devices, and processor 50 may also determine the addresses along bus 22 via which I/O controller 26 and card 56 may be controlled and/or configured during configuration cycles initiated by I/O processor 50, using hardware mechanism 24.

After processor 50 has completed operation 306, processor 50 may resource and/or configure any bus addressable devices that it determines to be controllable and/or configurable by processor 50 using hardware 24, based upon configuration information obtained by processor 50 from such devices, as illustrated by operation 308 in FIG. 3. That is, processor 50 may allocate resources to and/or configure any such bus addressable devices. As used herein, a "resource" of a system may include a facility, instrumentality, and/or identifier for such facility and/or instrumentality in the system that may be allocated (e.g., granted) from a pool of facilities, instrumentalities, and/or identifiers, for use by and/or association with one or more devices in the system. Operations 400 that may be performed to resource and/or configure any such bus addressable devices are illustrated in FIG. 4.

Figure 4:
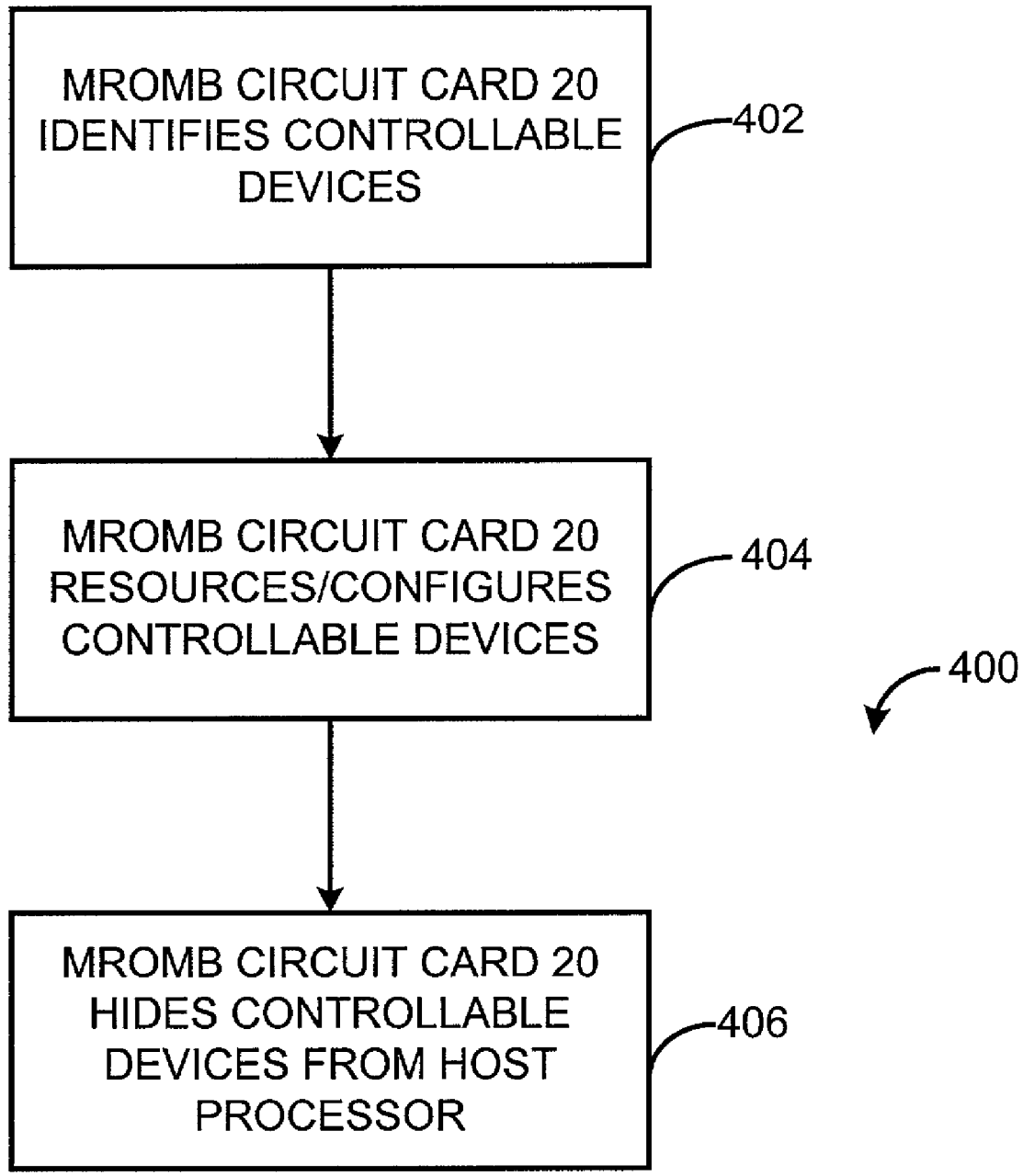
FIG. 4 is a flowchart illustrating operations that may be involved in configuring an I/O controller and circuit card in accordance with one embodiment.

As shown by operation 402 in FIG. 4, processor 50 may request (e.g., via one or more configuration read requests issued via bus 22) and obtain (e.g., via one or more configuration read responses issued via bus 22) configuration information from I/O controller 26 and/or card 56 that may identify the particular device types and characteristics of I/O controller 26 and/or card 56. Based upon this information, processor 50 then may signal card 20 to supply and store in controller 26, card 56, and/or memory 21 control and/or configuration-related information to permit controller 26 and/or card 56 to operate in accordance with predetermined and/or enhanced I/O procedures. As a result of the signaling of card 20 by processor 50, card 20 may apply, via bus 22, signals to card 56, memory 21 and/or controller 26. The signals that may be applied to controller 26 and/or card 56 by card 20 may include one or more IDSEL signals that may applied to controller 26 and/or card 56 via lines 43 and 66, respectively. The application of the signals applied to memory 21, card 56, and/or controller 26 by card 20 may result in the storing of such control and/or configuration-related information in card 56, controller 26, and/or in locations in memory 21, as shown by operation 404 in FIG. 4. The locations in memory 21 into which such control and/or configuration-related information may be stored by card 20, may be pre-selected so as not to conflict with locations in memory 21 that might be selected by host processor 12, such as, for example, during configuration cycles initiated and/or carried out by the host processor 12, for storage of control and configuration-related information for devices configured by host processor 12. If I/O device 28 comprises an array of disk mass storage devices, these I/O procedures may permit I/O controller 26 and the array to be used as a RAID storage controller and/or RAID array, respectively. Alternatively, if I/O device 28 is used to interface system 100 to an external computer network, the I/O procedures may permit I/O controller 26 to be used as a server management controller, and/or may permit controller 26 and device 28 to utilize additional communication protocols. Additionally, for example, if I/O device 44 comprises an array of disk mass storage devices, these I/O procedures may permit card 56 and the array to be used as a RAID storage controller and/or RAID array, respectively. Alternatively, if I/O device 44 is used to interface system 100 to an external computer network, the I/O procedures may permit card 56 to be used as a server management controller, and/or may permit card 56 and device 28 to utilize additional communication protocols.

Thereafter, processor 50 may signal card 20. This may result in card 20 de-asserting the TMS signal propagated via line 208. This may hide I/O device 26 and card 56 from host processor 12, as illustrated by operation 406 in FIG. 4. This may conclude operations 400.

After completing operations 400, processor 50 may signal card 20. This may result in card 20 no longer issuing retries to host processor 12. This may permit host processor 12 to continue with its configuration cycles, as illustrated by operation 310 in FIG. 3.

After host processor 12 has completed its configuration cycles in system 100, I/O processor 50 may receive and process interrupts received from I/O controller 26 and/or card 56. I/O processor 50 may generate and supply to I/O controller 26 and/or card 56 commands and/or data, in response to these interrupts.

Although not shown in the Figures, card 20 may include additional circuitry that may facilitate or permit card 20 to carry out the operations described herein and/or additional operations. For example, such additional circuitry in card 20 may include logic that prevents assertion by card 20 of the TMS signal transmitted via line 208 unless the PCI GNT# signal (not shown) of bus 22 is also asserted for card 20. This may permit card 20 to undertake and/or continue operations directed to locating, configuring, and/or controlling bus addressable devices, such as, for example, controller 26 and/or card 56, that may be controllable and/or configurable by processor 50 using hardware 24, after card 20 has ceased issuing retries to processor 12 and/or prior to card 20 issuing such retries to processor 12.

Additionally, although not shown in the Figures, card 56 may include a jumper that may be used, instead of jumper 63, to control the TDI signal from slot 58. If card 56 includes such a jumper, then motherboard 32 and/or slot 58 may not comprise jumper 63.

Further, although motherboard 32 has been described as comprising only a single I/O controller 26, motherboard 32 may comprise multiple such I/O controllers, without departing from this embodiment. In this alternate arrangement, the multiple I/O controllers in motherboard 32 may be coupled to MROMB hardware 24. Card 20 may be capable of controlling and/or configuring these multiple I/O controllers using hardware 24.

Similarly, although system 100 has been described as comprising only a single secondary MROMB card 56, system 100 may comprise a plurality of such secondary MROMB cards, without departing from this embodiment. In this alternate arrangement, card 20 may be capable of controlling and/or configuring the plurality of second MROMB cards using hardware 24.

In summary, in one system embodiment, a motherboard is provided that includes a bus, first and second bus interfaces, and at least one input/output (I/O) device. Also in this system embodiment, a first MROMB circuit card and a second MROMB circuit card are provided that are capable of being coupled to the bus via the first and second interfaces. When the first and second circuit cards are coupled to the first and second interfaces, the first card may be capable of controlling, at least in part, whether IDSEL signal lines (e.g., lines of the second device and the I/O device are coupled to the bus. After these IDSEL signal lines are coupled to the bus, the first card may be capable of supplying to the second card and to the I/O device, via the IDSEL signal lines, one or more IDSEL signals. These one or more IDSEL signals, after being received by the second card and the I/O device may permit the first card to control and/or configure the second card and/or the I/O device.

Thus, in this system embodiment, multiple devices may be configurable and/or controllable by the first MROMB circuit card, and the multiple devices that may be configurable and/or controllable by the first MROMB circuit card may comprise one or more secondary MROMB circuit cards and/or motherboard I/O devices. Advantageously, this may improve the ability of the system to offer modified, upgraded, enhanced and/or improved I/O capabilities.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:

controlling, at least in part, by a first device, whether a first signal line of a second device is coupled to a bus and whether a second signal line of a third device is coupled to the bus; and after the first and second signal lines are coupled to the bus, supplying from the first device to the second and third devices, via the first and second signal lines, one or more signals that, after being received by the second and third devices, permit, at least in part, at least one of control and configuration by the first device of the second and third devices;

a first circuit card comprising the first device, a second circuit card comprising the second device, the first device being coupled to the second device and to the third device via a mechanism that permits the first device to control whether the signals lines are coupled to the bus, the mechanism also permitting the first device to receive one or more interrupt signals from at least one of the second device and the third device, the one or more signals comprising Initialization Device Select (IDSEL) signals.

2. An apparatus comprising:

a first device to control, at least in part, whether a first signal line of a second device is coupled to a bus, to control, at least in part, whether a second signal line of a third device is coupled to the bus, and after the first and second signal lines are coupled to the bus, to supply to the second and third devices, via the first and second signal lines, one or more signals that, after being received by the second and third devices, permit, at least in part, at least one of control and configuration by the first device of the second and third devices;

a first circuit card comprising the first device, a second circuit card comprising the second device, the first device being coupled to the second device and to the third device via a mechanism that permits the first device to control whether the signals lines are coupled to the bus, the mechanism also permitting the first device to receive one or more interrupt signals from at least one of the second device and the third device, the one or more signals comprising Initialization Device Select (IDSEL) signals.

3. An article comprising:

a storage medium having stored thereon instructions that when executed by a machine result in the following:

controlling, at least in part, by a first device, whether a first signal line of a second device is coupled to a bus, and whether a second signal line of a third device is coupled to the bus; and after the first and second signal lines are coupled to the bus, supplying from the first device to the second and third devices, via the first and second signal lines, one or more signals that, after being received by the second and third devices, permit, at least in part, at least one of control and configuration by the first device of the second and third devices;

a first circuit card comprising the first device, a second circuit card comprising the second device, the first device being coupled to the second device and to the third device via a mechanism that permits the first device to control whether the signals lines are coupled to the bus, the mechanism also permitting the first device to receive one or more interrupt signals from at least one of the second device and the third device, the one or more signals comprising Initialization Device Select (IDSEL) signals.

4. A system comprising:

a circuit board including a bus, a first bus interface, a second bus interface, and at least one input/output (I/O) device; and a first device and a second device capable of being coupled to the bus via the first interface and the second interface, respectively, and when the first device and the second device are coupled to the bus via the first interface and the second interfaces, the first device is capable of controlling, at least in part, whether a first signal line of the second device is coupled to the bus and whether a second signal line of the at least one I/O device is coupled to the bus, and after the first and second signal lines are coupled to the bus, the first device is also capable of supplying to the second device and to the at least one I/O device, via the first and second signal lines, one or more signals that, after being received by the second device and by the at least one I/O device, permit, at least in part, at least one of control and configuration by the first device of the second device and the at least one I/O device;

a first circuit card comprising the first device, a second circuit card comprising the second device, the first device being coupled to the second device and to the I/O device via a mechanism that permits the first device to control whether the signals lines are coupled to the bus, the mechanism also permitting the first device to receive one or more interrupt signals from at least one of the second device and the I/O device, the one or more signals comprising Initialization Device Select (IDSEL) signals.

5. The system of claim 4, wherein:

the at least one I/O device comprises at least one of a data storage controller, a network data communication controller, and a server management controller; and the first device comprises an I/O processor.

6. The system of claim 4, wherein:

the second device comprises at least one of a data storage controller, network data communication controller, and a server management controller.

7. The system of claim 4, wherein:

the circuit board comprises the mechanism, and the mechanism includes a modular redundant array of inexpensive disks (RAID) on motherboard (MROMB) mechanism coupled to the second interface.

8. The system of claim 7, wherein:

the circuit board also includes an interrupt controller and a jumper to select a control signal to be supplied to the mechanism, and the control signal controls, at least in part, whether an interrupt signal line from the second interface is coupled to the interrupt controller.

9. The system of claim 8, wherein:

the control signal also controls whether the first signal line is coupled to the bus.

\* \* \* \* \*